United States Patent [19]

Srivastava

[11] 3,959,594

[45] May 25, 1976

[54] ARRANGEMENT AND METHOD FOR THE LOCALIZED SELF-CONTROL OF RANDOMLY ALLOTTED TIME SLOTS TO AUDIO PORTS

[75] Inventor: Dinesh K. Srivastava, Westmont, Ill.

[73] Assignee: GTE Automatic Electric Laboratories Incorporated, Northlake, Ill.

[22] Filed: July 1, 1974

[21] Appl. No.: 484,390

[52] U.S. Cl. .................. 179/15 AQ; 179/15 BA; 179/15 AL
[51] Int. Cl.² .................................. H04J 3/00
[58] Field of Search ...... 179/15 AQ, 15 AT, 15 BA, 179/15 A, 18 GF, 15 AL

[56] References Cited
UNITED STATES PATENTS

| | | | |
|---|---|---|---|
| 3,617,643 | 11/1971 | Nordquist | 179/15 AQ |
| 3,643,030 | 2/1972 | Sparrendahl | 179/15 BA |
| 3,644,679 | 2/1972 | Tallegas | 179/15 AQ |
| 3,736,381 | 5/1973 | Johnson | 179/15 AQ |
| 3,737,586 | 6/1973 | Johnson | 179/15 AQ |
| 3,840,707 | 10/1974 | Hemdal | 179/15 AQ |

*Primary Examiner*—Kathleen H. Claffy
*Assistant Examiner*—Joseph Popek
*Attorney, Agent, or Firm*—Robert J. Black

[57] ABSTRACT

An arrangement and method for the localized self control of randomly allotted time slots to audio ports wherein simple control circuits with a memory are dedicated on a per audio port basis. A common control writes into the memory the time slot identity allotted to an audio port. The time slot identities generated by a channel counter are made available to all of the audio ports in the system, and a comparator in the control circuit associated with an audio port compares the stored time slot identity with the variable or varying time slot identities. An audio port is turned on and off without external control every time the two identities match. With this arrangement, any number of audio ports can have the same time slot identity, all turning on and off simultaneously in the same time slot to share the transmission medium.

9 Claims, 3 Drawing Figures

LOCALIZED CONTROL CKT.
CARD 1

ARRANGEMENT AND METHOD FOR THE LOCALIZED SELF-CONTROL OF RANDOMLY ALLOTTED TIME SLOTS TO AUDIO PORTS

BACKGROUND OF THE INVENTION

This invention relates to a communication switching system. More particularly, it relates to an improved arrangement and method for the localized self control of randomly allotted time slots or channels to audio ports in a time division multiplexed communication switching system.

In time-shared communication switching systems, such as time division multiplexed (TDM) and pulse code modulation (PCM) systems, it is often desirable to concentrate a large number of audio ports into a fixed number of time slots or channels. Audio ports, in this case, refer to subscriber lines, trunks, tones, etc. Concentrating the audio ports in this fashion results in a highly efficient usage of the time-shared medium.

Normally, in typical time-shared systems, the audio ports are dedicated on a time slot basis, i.e., each audio port is rigidly pre-assigned a hard-wired fixed time slot. There, therefore, must be provided as many time slots as there are audio ports. Such schemes provide 100 percent channel availability, however, a substantial amount of hardware is required. With many types of telephone communication switching systems, this hardware is used very often inefficiently, due to the nature of the telephone traffic. In such systems, the audio ports are individually turned on and off by dedicated leads wired to a central location or common control. Efforts at concentrating these dedicated leads have resulted in complex control circuitry, and hence have been generally undesirable. As a result, numerous problems arise, including among others, the fact that switching transients in the background are increased due to a number of audio ports being given turn on and turn off signals at very rapid rates. Further still, the channel control pulses become of uneven durations, and usually only one audio port can be turned on in any time slot from one decoder.

SUMMARY OF THE INVENTION

In accordance with the arrangement and method of the present invention, simple control circuits with a memory are dedicated on a per audio port basis. A common control writes into the memory time slot identity allotted to an audio port. The time slot identities generated by a channel counter are made available to all of the audio ports in the system, and a comparator in the control circuit associated with an audio port compares the stored time slot identity with the variable or varying time slot identities. An audio port is turned on and off without external control every time the two identities match. With this arrangement, any number of audio ports can have the same time slot identity, all turning on and off simultaneously in the same time slot to share the transmission medium.

More particularly, each audio port is equipped to be uniquely addressed by the common control, in a specific time slot intended to be allotted to that audio port. The audio port allows the time slot identity to be stored in the memory, as a result of it being addressed. The stored time slot identity is compared with the time variant slot identities and, upon matching, the control circuit enables the audio port's transmit and/or receive gates in the allotted time slot. The common control waits to address an audio port, until the time slot identity intended for allotment to that audio port becomes true. The time slot identity is stored and subsequently used independently of the common control, to gate the audio port onto the transmission medium.

The arrangement provides numerous advantages, including the advantage that any audio port can be allotted any time slot. The allotment furthermore can be random. Any number of audio ports also can share the same time slot, thereby overcoming one of the most severe problems in hard wired control of individual audio ports with common address leads. In systems of the latter type, the address must be charged as many times as the number of audio ports to be turned on in that time slot which, in itself, is a disadvantage and, furthermore, alters the sample widths. Still another advantage is that each audio port turns on and off by itself, thereby providing precisely controlled sample durations. The common control also is simplified, as the allotment is retained in a memory, with the allotment being stored during the time slot the audio port was first enabled.

In addition to these advantages, the arrangement lends itself to multiplexing any number of audio ports for conferencing, since any number of audio ports can be simultaneously enabled in the same time slot. Higher order multiplexing also can be accomplished with greater ease. The arrangement lends itself to large scale integration by itself, or with other parts of the audio port circuit. A built-in feature for remote testing also is provided.

Accordingly, it is an object of the present invention to provide an improved method and arrangement for the localized self-control of randomly allotted time slots to audio ports in a time division multiplexed communication switching system.

Other objects of the invention will in part be obvious and will in part appear hereinafter.

BRIEF DESCRIPTION OF THE DRAWINGS

For a fuller understanding of the nature and objects of the invention, reference should be had to the following detailed description taken in conjunction with the accompanying drawings, in which.

Similar reference characters refer to similar parts throughout the several views of the drawings.

DESCRIPTION OF THE PREFERRED EMBODIMENT

Figure 1:
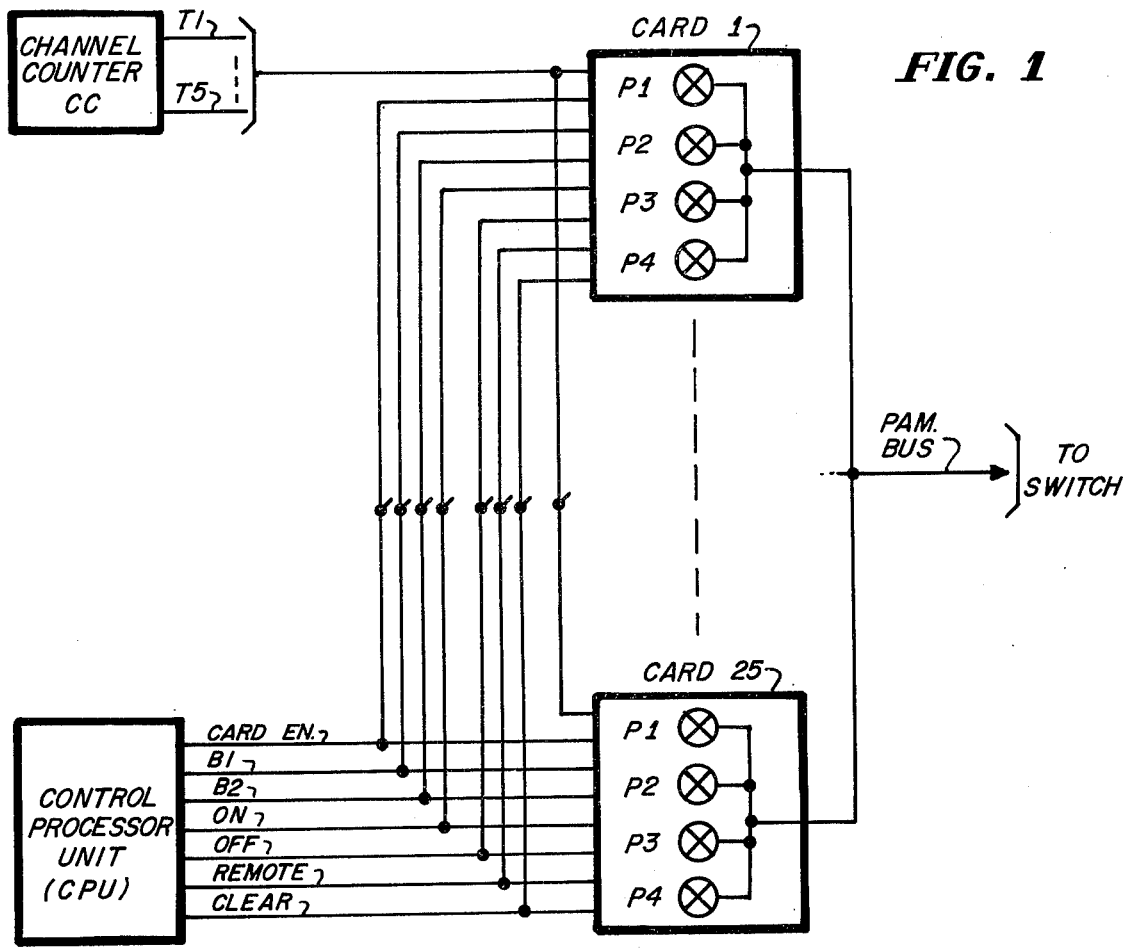
FIG. 1 is a block diagram representation of a time division multiplexed communication switching system including, in the illustrated embodiment, 100 audio ports which are to be multiplexed onto a common pulse amplitude modulation (PAM) bus.

Referring now to the drawings, in FIG. 1 there is illustrated 100 audio ports P1–P100 which are multiplexed onto a transmission medium, in this case, a pulse amplitude modulation (PAM) bus to a switching system, which may be of the type well-known in the art. In the illustrated embodiment, the audio ports are assigned to cards, with four audio ports being assigned to each of 25 cards. A channel counter CC which can be a conventional 24 channel counter generates output bits T1–T5 which are coupled in multiple to each of the cards 1 through 25. The output bits T1–T5 define or provide 24 different time slots or channels which may be assigned to any one of the audio ports P1–P100 in the manner described more fully below. The assignment of a channel or time slot to an audio port, as in all systems of this type, is controlled by a common control or control processor unit CPU. As indicated above, normally, in time-shared systems of this type, the audio ports are dedicated on a time slot basis, with each audio port being rigidly pre-assigned a hard wired, fixed time slot. In such systems, as many time slots as there are audio ports must therefore be provided.

In accordance with the arrangement and method of the present invention, any one of the audio ports P1–P100 can be allotted any one of the 24 time slots. To accomplish the allotment of the time slots to the audio ports P1–P100 in this fashion, the CPU outputs a number of control signals to the audio ports including a card enable signal (CARD EN) which is dedicated on a per card basis and control signals B1, B2, ON, OFF, REMOTE and CLEAR, with all of these latter signals being multiplied to all of the audio ports. The B1 and B2 signals from the address of a specific one of the audio ports P1–P100, as more fully described below.

Figure 3:
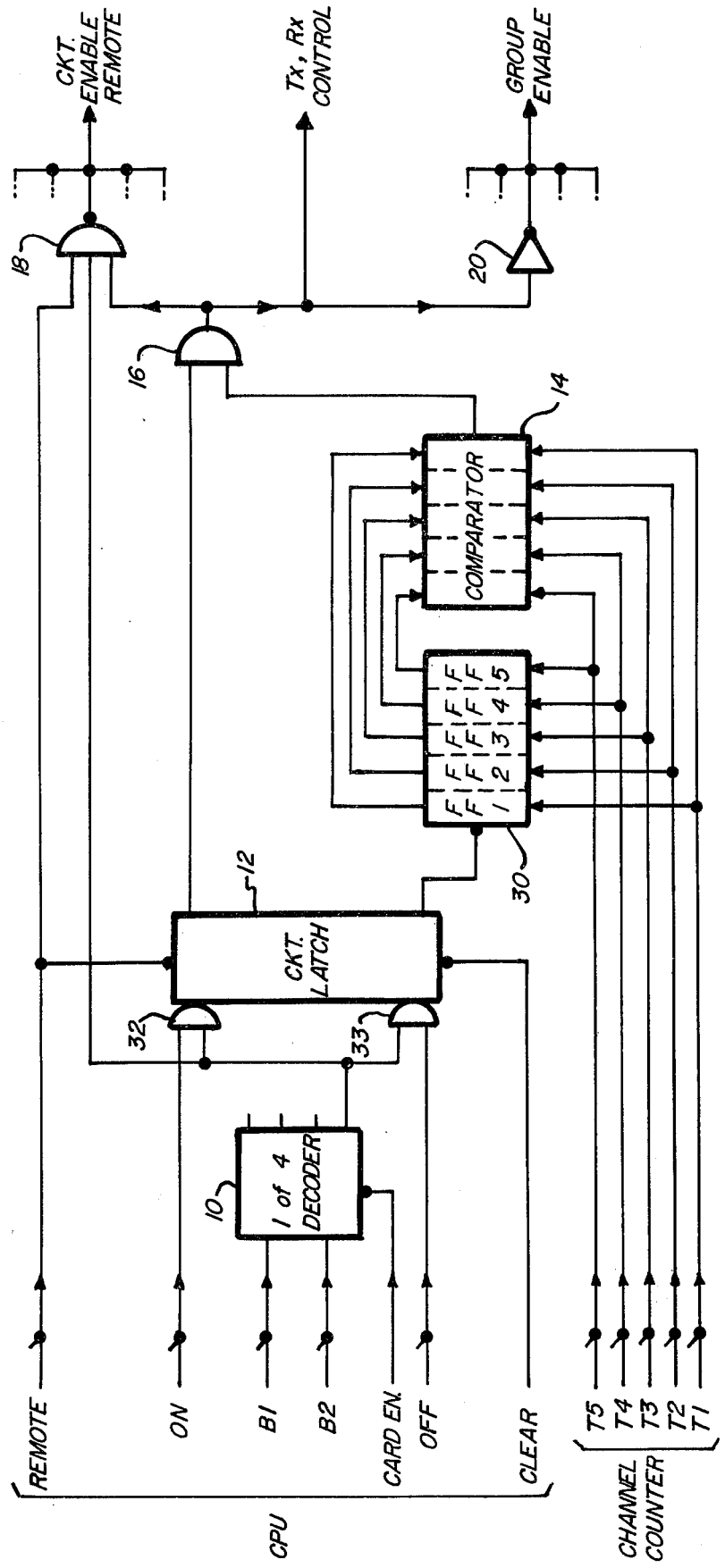
FIG. 3 is a block diagram schematic of the control circuit and memory associated with each of the audio ports, in accordance with the present invention.

As can be seen in FIG. 3, wherein the control circuit and memory of one of the audio ports on card 1 is illustrated, each of the cards 1–25 has a decoder 10 which may be a one-of-four type decoder SN74155, and the B1 and B2 signals from the CPU are coupled in multiple to these decoders and are decoded to address a specific one of the audio ports P1–P100. The decoders 10 are enabled by the card enable control signals CARD EN which, as indicated above, are each dedicated to one of the cards 1–25. Accordingly, the CPU can address any one of the audio ports P1–P100 by enabling the decoder 10 on the particular card on which the audio port is located, via the card enable control signal CARD EN, and by the signals B1 and B2 which are coupled to the decoder 10 and decoded by the latter to address the particular one of the audio ports on the enabled card. On decoding the B1 and B2 control signals, the decoder 10 outputs a circuit enable control signal CKT EN to the control circuit associated with the addressed audio port.

The control circuits each include a latch 12 which may be a type SN74L71, a comparator 14 which may be a type SN8242 exclusive OR gate with open collector, and a type SN7408 AND gate 16. The Q output of the latch 12 and the output of the comparator 14 are coupled to the input of the AND gate 16 and enable this AND gate 16 to gate the transmission Tx and receive Rx gates (FIG. 2) of the audio port to the common transmission highway or PAM bus, via the Tx, Rx control lead, in the manner well-known in the art. A memory 30 which may be formed of five type SN7475 flip-flops also is associated with each audio port. The time slot identity bits T1–T5 from the channel counter CC are coupled in multiple to the memory 30 of each of the audio ports P1–P100, and a time slot identity is coupled into and stored in a memory 30, when a latch 12 is enabled and its $\overline{Q}$ output goes low to a logic 0. The output of the memory 30 is coupled to a comparator 14, as are the bits T1–T5 from the channel counter CC. If the comparator 14 finds a match between the T1–T5 bits and the output of the memory 30, it outputs a logic 1 to the input of the AND gate 16. When the Q output of the latch 12 also is a logic 1, the AND gate 16 is enabled to output a logic 1 on the Tx, Rx control lead to the respective transmission and receiving gates of the audio port (FIG. 2) to gate the audio signals onto the PAM bus.

More specifically, the channel counter CC runs continuously and outputs the time slot identity bits T1–T5 which are coupled in multiple to each of the cards 1–25. The common control or CPU, upon demand, allots a time slot to an audio port by outputting a signal on the card enable lead CARD EN which, as indicated above, is dedicated to the respective cards 1–25, and outputs signals on the leads B1 and B2 in multiple to each of the cards 1–25. The control signal on the CARD EN lead enables the decoder 10 on the card on which the audio port is assigned, and the one out of the four audio ports is selected or enabled by the decoder 10 in decoding the control signals on the leads B1 and B2 and providing the control signal CKT EN to the control circuit associated with the audio port.

Assume for the purpose of discussion that the audio port selected is the audio port P4 on card 1, the control signal CKT EN becomes true and is coupled to the one input of each of the AND gates 32 and 33. These AND gates 32 and 33 are actually internal to the latch 12, however, are shown separate therefrom for clarity in explaining the operation. The time slot identity bits T1–T5 are coupled to the memory 30, and when the time slot to be allotted to the audio port P5 becomes true, the control signal on the lead ON becomes true and is coupled in multiple to each of the cards 1–25, to the latches 12 (AND gates 32) associated with each of the audio ports. At this time, since only the control signal CARD EN coupled to card 1 is true, only the AND gate 32 associated with the audio port P4 is enabled to output a logic 1 to the S input of the latch 12 to set it so that its Q output goes to a logic 1. Simultaneously, the $\overline{Q}$ output of the latch 12 goes to a logic 0 and the bits T1–T5 identifying the time slot or channel are coupled into the memory 30 and stored therein.

The output of the memory 30 is coupled to the input of the comparator 14, as are the bits T1–T5 identifying the time slot coupled into and stored in the memory 30. Upon finding a match, the output of the comparator goes to a logic 1 and is coupled to the AND gate 16. Since the Q output of the latch 12 now is at a logic 1 and the output of the comparator 14 also is at a logic 1, the AND gate 16 is enabled to couple a logic 1 to the respective transmission Tx and receive Rx gates (FIG. 2) of the audio port P4 on the Tx, Rx control lead, to gate the audio signals onto the PAM bus.

Whe the bits T1–T5 from the channel counter CC change, identifying another time slot, the comparator 14 fails to find a match between the output of the memory 30 and the T1–T5 bits, so that its output goes low to a logic 0. This logic 0, upon being coupled to the AND gate 16, disables it and, in turn, the transmission Tx and receive Rx gates of the audio port P4, thereby blocking transmission on the PAM bus.

During the next occurrence of the time slot allotted to the audio port P4, the comparator again will find a match between the T1–T5 bits and the output of the memory 30, so that its output again goes high to a logic 1. When this logic 1 is again coupled to the AND gate 16, the latter is enabled to again enable the transmission and receive gates of the audio port.

Accordingly, from the above description, it can be seen that each of the audio ports P1–P100 is equipped to be uniquely addressed by the common control or CPU, in a specific time slot intended to be allotted to that audio port. The time slot identity is stored in the memory 30, as a result of the audio port being addressed. The stored time slot identity is compared by means of the comparator 14 with the varying bits T1–T5 identifying the time slots and, upon finding a match between the output of the memory 30 and the T1–T5 bits coupled to the comparator 14, the comparator enables the AND gate 16 of the control circuit associated with the audio port to, in turn, enable the transmit and/or receive gates Tx and Rx of the audio port, in the allotted time slot. The time slot identify therefore is stored and subsequently used independently of the common control, to gate the audio port onto the transmission median or PAM bus.

It can be further seen that any of the audio ports P1–P100 can be allotted any one of the time slots, and that the allotment can be in a random fashion. Any number of the audio ports P1–P100 also can share the same time slot, by addressing that audio port and writing and storing the time slot identity in its associated memory 30. Once the time slot identity is stored in the memory 30 associated with an audio port, the audio port turns on and off by itself, thereby providing precisely controlled sample durations.

The audio ports can be disabled asynchronously by addressing the audio port via the leads B1, B2 and CARD EN, and by coupling a control signal on the lead OFF. When the control signal on the lead OFF becomes true, and the AND gate 33 is enabled to reset the latch 12, so that its Q output goes to 0 and its $\overline{Q}$ output goes to a logic 1. The logic 0 and the Q output of the latch 12, upon being coupled to the AND gate 16, disables the latter so that the transmission and receive of the audio port cannot be enabled to gate the audio signals onto the PAM bus.

As indicated above, the arrangement lends itself to multiplexing any number of audio ports for conferencing, since any number of audio ports can be simultaneously enabled in the same time slot. Furthermore, higher order multiplexing also can be accomplished with greater ease. For this latter purpose, the common control further is provided with an invertor 20 which may be a type SN7405, and the output of the AND gate 16 is coupled to and through this invertor 20, to a multiple GROUP ENABLE lead (FIGS. 1 and 3). With this arrangement, whenever any of the AND gates 16 of any of the control circuits associated with any of the audio ports P1–P100 is enabled, the signal in addition to being couplped to the transmit and receive gates of the audio port also is coupled through the invertor to the GROUP ENABLE lead. When the GROUP ENABLE lead becomes 0, an indication is provided that an audio port is active in the allotted slot, thus allowing multiplexing of several groups.

Figure 2:
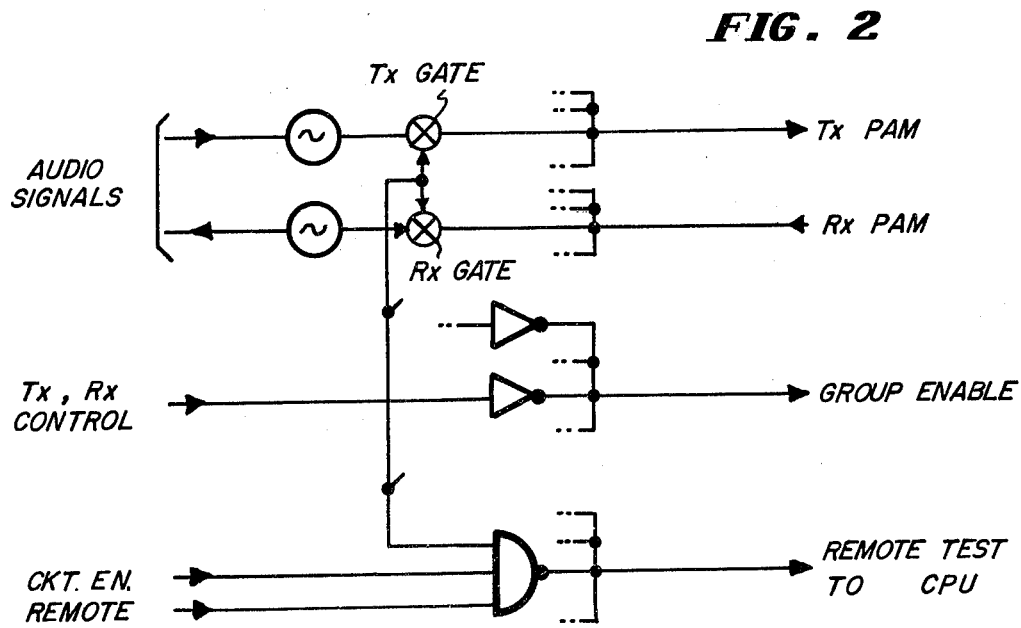
FIG. 2 is a schematic representation of one of the audio ports.

Further still, as indicated above, a built-in feature for remote testing also is provided. In this respect, the control circuit associated with each of the audio ports further is provided with a NAND gate 18 which may be a type SN 7412. This lead REMOTE from the CPU is coupled in multiple to all of the NAND gates 18 of each of the audio ports. Also, the output of the respective AND gates 16 are coupled to the associated NAND gate 18, as is the lead CKT EN from the decoder 10. With this arrangement, remote testing can be done "on line" with the audio port to be tested being in the active mode at the time of testing, or in "off line" condition. When the signal on the lead REMOTE is true, it inhibits change of state of all of the latches 12 associated with each of the audio ports P1–P100. If the signal on the leads B1, B2 and CARD EN all are true, and the comparator 14 finds a match, the output of the NAND gate 18 becomes 0, sending a reply to the CPU or a test set, as shown in FIG. 2.

The entire system can be asynchronously cleared (all connections drop) by making the signal on the lead CLEAR true.

It will thus be seen that the objects set forth above among those made apparent from the preceding description, are efficiently attained and certain changes may be made in carrying out the above method and in the construction set forth. Accordingly, it is intended that all matter contained in the above description or shown in the accompanying drawings shall be interpreted as illustrative and not in a limiting sense.

Now that the invention has been described, what is claimed as new and desired to be secured by Letters Patent is:

1. In a time-shared communication switching system having a plurality of audio ports, each of which has gating means for coupling audio signals to a common transmission medium, channel counter means for providing a plurality of time slot identity bits, each defining a distinct time slot, and a common control for addressing and providing control signals to said audio ports, the improvement comprising a memory and control means including comparator means associated with each of said audio ports, said plurality of time slotted identity bits being coupled in multiple to said audio ports, said audio ports each being addressed by the common control in a specific time slot intended to be allotted to that audio port, any one of said audio ports allottable to any time slot, with said allotment being in a random fashion, a plurality of said audio ports addressable during the same time slot whereby any number of audio ports can be multiplexed for conferencing, said control means being operated as a result of said audio port being addressed to cause the time slot identity bits corresponding to the time slot to be allotted to that audio port to be coupled into and stored in said memory, said comparator means comprising said stored time slot identity bits with each of said plurality of time slot identity bits coupled in multiple to said audio ports and upon determining a match enabling the gating means during the allotted time slot to couple the audio signals onto the common transmission medium, whereby said allotted time slot identity is stored and subsequently used independently of the common control to gate the audio signals onto the common transmission medium.

2. In a time-shared communication switching system, the improvement of claim 1, wherein said plurality of audio ports are assigned in groups of a pre-determined number of audio ports to individual ones of a plurality of cards, each of said cards comprising decoder means for decoding address bits coupled thereto in multiple from the common control and for enabling said control means associated with the addressed one of said audio ports.

3. In a time-shared communication switching system, the improvement of claim 2, wherein each of said decoder means is enabled by said common control to decode said address bits by a control signal dedicated to each of said cards, whereby only one of said decoder means is enabled to decode said address bits coupled thereto in multiple from said common control.

4. In a time-shared communication switching system, the improvement of claim 3, wherein said control means further comprises output gating means and latch means having a first output coupled to said output gating means and a second output coupled to said memory, said decoder means upon being enabled and decoding said address bits operating said latch means to a set state to gate said time slot identity bits into said memory, the output of said comparator means being coupled to said output gating means, said output gating means being enabled when said latch means is in said set state and said comparator finds a match to enable the gating means during the allotted time slot to couple the audio signals onto the common transmission medium.

5. In a time-shared communication switching system, the improvement of claim 1 wherein said control means further comprises output gating means and latch means having a first ouptut coupled to said output gating means and a second output coupled to said memory, said latch means being operated to a set state when said audio port with which it is associated is addressed to gate said time slot identity bits into said memory.

6. In a time-shared communication switching system, the improvement of claim 5 wherein the output of said comparator means is coupled to said output gating means, said output gating means being enabled when said latch means is operated to said set state and said comparator fidns a match.

7. In a time-shared communication switching system, the improvement of claim 4 wherein the output of said output gating means is coupled in multiple to a group enable control lead, for higher order multiplexing.

8. In a time-shared communication switching system, the improvement of claim 4 wherein said control means further comprises test gate means having its output coupled to a remote rest location for providing thereto a test signal, the outputs of said decoder means and said output gating means being coupled to said test gate, a control signal from said common control being coupled to said test gate, whereby said test gate is enabled to output said test signal when said output gating means and said decoder means are enabled in coincidence with said control signal from said common control.

9. In a time-shared communication switching system, the improvement of claim 8, wherein said latch means further comprises an inhibit input which when enabled prevents said latch means from being operated from a set state, said control signal from said common control being coupled to said inhibit input to enable it.

* * * * *

UNITED STATES PATENT AND TRADEMARK OFFICE
CERTIFICATE OF CORRECTION

PATENT NO. : 3,959,594
DATED : May 25, 1976
INVENTOR(S) : DINESH K. SRIVASTAVA

It is certified that error appears in the above-identified patent and that said Letters Patent are hereby corrected as shown below:

Column 6, line 43, "comprising" should be -- comparing --

Column 7, line 19, (first occurence) "ouptut" should be

-- output --

Column 8, line 3, "fidns" should be -- finds -- line 12, "rest" should be -- test --.

Signed and Sealed this

Third Day of August 1976

[SEAL]

Attest:

RUTH C. MASON
*Attesting Officer*

C. MARSHALL DANN
*Commissioner of Patents and Trademarks*